United States Patent [19]
Bret

[11] Patent Number: 5,305,082
[45] Date of Patent: Apr. 19, 1994

[54] HIGH SPATIAL RESOLUTION IMAGING SPECTROGRAPH

[75] Inventor: Georges G. Bret, Sunnyvale, Calif.

[73] Assignee: Chromax, Inc., Albuquerque, N. Mex.

[21] Appl. No.: 819,368

[22] Filed: Jan. 8, 1992

[51] Int. Cl.$^5$ ............................ G01J 3/18; G01J 3/36
[52] U.S. Cl. .................................. 356/328; 356/305; 356/334
[58] Field of Search ............... 356/326, 328, 302, 305, 356/330–334

[56] References Cited

U.S. PATENT DOCUMENTS

| | | | |
|---|---|---|---|
| 3,025,744 | 3/1962 | Collyer | 88/14 |
| 4,329,050 | 5/1982 | Olsen | 356/305 |
| 4,650,321 | 3/1987 | Thompson | 356/73 |
| 4,936,684 | 6/1990 | Keane | 356/328 |
| 5,078,495 | 1/1992 | Harada et al. | 356/334 |

FOREIGN PATENT DOCUMENTS

| | | | |
|---|---|---|---|
| 0037787 | 10/1981 | European Pat. Off. | 356/334 |
| 1185113A | 10/1985 | U.S.S.R. | 356/326 |

OTHER PUBLICATIONS

Bilhorn et al, "Elemental Analysis with Plasma Emission Echelle Spectrometer Employing a Charge Injection Device (CID) Detector," Applied Spectroscopy, vol. 43, #1, 1989, pp. 1 ∝ 11.

Huegel, Frederick G., "Advanced Solidstate Array Spectrometer: Sensor and Calibration Improvements," SPIE vol. 834 Imaging Spectroscopy II (1987).

Primary Examiner—Vincent P. McGraw
Assistant Examiner—K. P. Hantis
Attorney, Agent, or Firm—John R. Lansdowne

[57] ABSTRACT

A high resolution fast imaging spectrograph is disclosed which provides 400 spatial channels and 100 spectral channels of information. A collimating mirror (10) and a focusing mirror (12) face a plane diffraction grating (14), which is positioned at an acute angle to the perpendicular to the optic axis. An elongated slot (16) is cut through approximately the center of the grating allowing the light source (18) to pass through the slot and onto the collimating mirror. A turning mirror (20), which is placed at the focus of the focusing mirror and adjacent to the slot, directs radiation to a camera mirror (22), which focuses a final image outside the instrument enclosure onto a detector (24). The light source to the instrument is provided by an optical fiber ribbon. The detector will commonly be a CCD or CID 2-D detector, permitting the simultaneous measurement of spectral distribution of a spatial profile. The instrument requires no power input, has no moving parts, and is completely passive with no operating controls or adjustments. Also disclosed is a commercially significant means to utilize the high spatial resolution imaging spectrograph in earth science remote imaging applications through the utilization of a reflecting telescope connected to the spectrograph by means of an optical fiber ribbon.

20 Claims, 2 Drawing Sheets

HIGH SPATIAL RESOLUTION IMAGING SPECTROGRAPH

BACKGROUND OF THE INVENTION

1. Field of the Invention

The present invention relates to a multi-channel spectrograph, and, more particularly, to a spectrograph optimized to provide the largest possible number of independent spatial channels in the vertical plane and more modest spectral resolution in the horizontal plane.

2. Description of the Related Art

Spectrographs, and more recently scanning monochromators, have been in use for some time in an increasingly large number of applications. However, until quite recently, these instruments were limited to gathering and processing information through one channel. Light entered the instrument from a single source, and the instrument physically separated the light according to its wavelengths and presented as the output a single spectrum, most often dispersed in the horizontal plane.

In theory, nothing would have prevented the designers of early instruments, built around a prism as a dispersive element, to fashion a multichannel instrument, since they had good imaging properties due to their dioptric input and output optical systems working on axis. For each wavelength, the same point of the entrance slit was imaged as a different point in the image field. This presented the opportunity of using several spatially distinct sources of light at the input to obtain several distinguishable spectra in the image plane of a single instrument. However, in practice the modest sensitivity of early detectors as well as the small apertures (f/16 or less) of these early instruments forced designers to improve throughput at the cost of spatial resolution by introducing the concept of the entrance slit placed perpendicular to the axis of dispersion.

Later, when reflection gratings were introduced, allowing for easy extension into the UV and IR parts of the optical spectrum, dioptric optics were replaced by mirrors, which are easy to produce with broad band reflectivity. While dioptric optics work naturally on axis, mirrors are easier to use at an angle leading to very large astigmatic deformation of the image, an effect that becomes very important with fast instruments which require wide open beams and closely packaged elements.

An elegant approach to solve the astigmatic deformation of the image has been to ignore it by using the plane of the tangential focus as the image plane. In this configuration, a point of the object plane is transformed into a vertical line and a vertical slit into a slightly longer vertical image, which preserves spectral resolution. As a result, the instrument keeps a good spectral resolution at the cost of spatial resolution. This is of no consequence in applications where the only concern is measuring the spectral properties of a single sample. However, there are an ever growing listing of applications which would benefit from both spectral and spatial information.

The advent of two dimensional arrays of high quantum efficiency detectors, such as modern charge-coupled-device (CCD) and charge-induced-device (CID) 2-D detectors, and optical fibers to transport light has suggested the desirability of using spectrographs as multichannel dispersive systems capable of generating independent spectra of different sources. However, multispectra systems require a spectrograph capable of spectrally dispersing light along one axis while maintaining the spatial integrity of the input image vertically. In other words, the spectrum produced at one height at the focal plane of the spectrograph should be from one point at the corresponding height at the entrance slit.

The construction of such a spectrograph poses a challenge to designers. Conventional designs suffer from vignetting, astigmatism, coma, and other sources of crosstalk that destroy spatial purity of the resulting image at the focal plane. In recent years manufacturers have begun the introduction of high performance spectrographs allowing for some astigmatism correction and opening the field of multichannel spectroscopy. In 1989, CHROMEX Inc., of Albuquerque, New Mexico, introduced the FF-250/FF-500 family of fast (f/4) spectrographs, which use toroidal mirrors, instead of spherical mirrors, to correct astigmatism of the instrument. This advance allows the instruments to become multichannel instruments, particularly useful for multichannel applications while remaining capable of performing spectral measurements with the same resolution as their more conventional counterparts.

These improved instruments remain spectrographs primarily optimized for high spectral resolution in the horizontal direction. The astigmatic correction provided by toroidal mirrors allows for a limited number of independent spatial channels, probably more than enough for most applications, but cannot provide for high spatial resolution compatible with good imaging. This is the case because today fast instruments have by nature a high degree of astigmatism that can be corrected only in a narrow range of angles. Furthermore, the image field of these instruments has by design a high degree of curvature further limiting spatial resolution.

For an increasing number of new survey applications, where high spectral resolution is not usually needed, it is desirable to have a multichannel spectrograph which is optimized for the highest possible spatial resolution in the vertical plane and a more modest spectral resolution. Particularly important uses for such an instrument are in high resolution, remote sensing of earth resources, in infrared imaging, and in microscopy.

SUMMARY OF THE INVENTION

It is an object of the present invention to provide a high resolution fast imaging spectrograph which is designed specifically to provide greatly enhanced spatial resolution while maintaining sufficient spectral resolution for a variety of applications. In particular, in accordance with the present invention, a high spatial resolution imaging spectrograph is provided which will provide greatly enhanced spatial resolution for land and sea remote sensing.

Another object of the present invention is to provide a high spatial resolution imaging spectrograph capable of continuous high speed measurement of spectral distribution information simultaneously at hundreds of points in a sample.

It is a further object of the present invention is to provide a high spatial resolution imaging spectrograph which is lightweight and compact, having no power requirements and no operating controls or adjustments.

It is a further object of the present invention to provide a high spatial resolution imaging spectrograph which allows for remote light gathering by means of a optical fiber cable or ribbon or a conventional optical system.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 2 is a pictorial representation of the image field, defined in terms of high spatial but limited spectral channels of information, found in a high spatial imaging spectrograph in accordance with the present invention;

DETAILED DESCRIPTION OF PRESENTLY PREFERRED EMBODIMENTS

Figure 1:
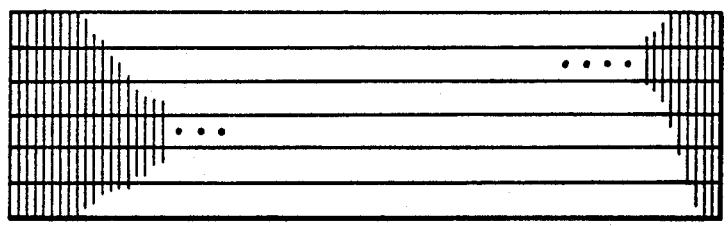
FIG. 1 is a pictorial representation of the image field, defined in terms of high spectral but limited spatial channels of information, found in a high resolution imaging spectrograph of the most recent design, such as the CHROMEX instruments.

As illustrated in FIG. 1, modern high resolution multichannel spectrographs are designed to provide the largest possible number of independent spectral channels in the horizontal direction and a only limited spatial resolution in the vertical. It is impossible for such spectrographs to provide high spatial resolution because modern fast instruments have a high degree of astigmatism which can be adequately corrected only in a narrow range of angles. Furthermore, the image field of these instruments has by design a high degree of curvature further limiting their spatial resolution. Commonly such instruments can achieve 500 spectral channels at the spectrograph output focal plane. Each such spectral channel is resolved into a maximum of 40 spatial channels across a wavelength range, which is defined by the grating used.

As illustrate in FIG. 2, a high spatial resolution imaging spectrograph in accordance with the present invention provides the highest possible spatial resolution in the vertical plane at the expense of more modest spectral resolution. An instrument of the present invention can achieve 400 to 1000 spatial channels at the spectrograph output focal plane. Each such spatial channel is resolved into 100 spectral channels cross a wavelength range of, for example, 400-800 nm.

An approximate expression of the situation is that an optical system based on a given set of components and providing a given throughput cannot transfer more than a given number of information channels. This number is, because of different aberrations, smaller than what diffraction would ultimately allow. The information channels can be arranged either to privilege the horizontal, or spectral, direction (as in the case for modern and conventional spectrographs) or the vertical, or spatial, direction (as is the case for a spectrograph in accordance with the present invention).

Figure 3:
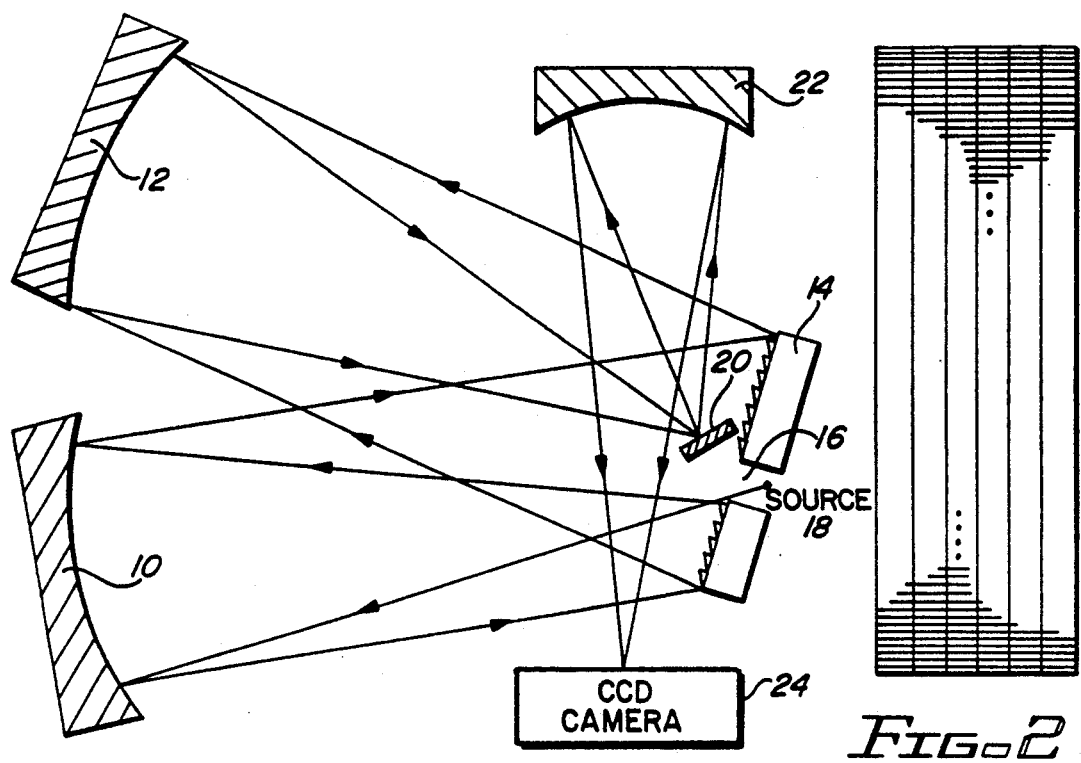
FIG. 3 is an optical ray path view along the cross-track axis of a preferred embodiment of a high spatial resolution imaging spectrograph in accordance with the present invention.

A high spatial resolution imaging spectrograph provided in accordance with the present invention can be seen in FIG. 3. Illustrated is a ray-path schematic view of an f/4 instrument capable of providing 400 spatial channels and 100 spectral channels across a wavelength range of 400 to 800 nm.

A first or collimating mirror 10 and a second or focusing mirror 12 are illustrated, each permanently attached to the base of the spectrograph. The mirrors are conventional 110 nm diameter spherical mirrors with a focal length of 250 nm facing a plane diffraction grating 14. The grating is also permanently affixed to the base of the spectrograph and at an acute angle $\theta$ to the perpendicular to the optic axis. The angle $\theta$ is somewhat dependent upon the grating selected in order not to work too far from the Littrow configuration, which allows for maximum throughput. Typically, $\theta$ will be in the range of 5 to 35 degrees depending on the groove density of the grating. The grating 14 is approximately 60×60 mm in size. An elongated slot 16, 4×20 mm in size, is cut through approximately the center of the grating 14, allowing the light source 18 to pass through the slot 16 and onto collimating mirror 10. The light source 18 is placed at the focus of the collimating mirror 10 and at a point where radiation can illuminate the collimating mirror.

Turning mirror 20 is a plane mirror, 10×20 mm in size, which also is fixed to the base of the spectrograph and positioned to reflect light from the focus of the focusing mirror 12 onto the third or camera mirror 22. The turning mirror is positioned as close as possible to the elongated slot 16, thus receiving an image as close as possible to the object. This placement of the turning mirror allows the spherical mirrors to work "almost on axis" in an angular range where angular dependent aberrations, particularly astigmatism, are negligible.

The camera mirror 22 is a conventional 110 mm diameter spherical mirror with a focal length of 150 mm which focuses a final image 25 mm outside the instrument enclosure onto a detector 24. As with the other instrument components, the camera mirror is also fixed to the base of the spectrograph and works "almost on axis".

The light source to the instrument is preferably provided by an optical fiber ribbon, with individual fiber diameters commonly in a range of 7-250 microns. Optical fibers with a diameter of 50 microns provide good spatial resolution and generally acceptable light levels. Larger diameter optical fibers provide more light, but at the expense of less resolution. Smaller diameter fibers limit the number of photons traveling through the fiber, although several layers of smaller diameter fibers (7-20 microns) are also acceptable. 400 fibers can each transmit light through the elongated slot 16 in the grating 14, allowing 400 channels of data to be imaged by the instrument.

The detector 24 will commonly be a CCD or CID 2-D detector array, having commonly the ability to resolve 1028×516 pixels. These devices permit the simultaneous measurement of spectral distribution of a spatial profile. Output from the detector is commonly sent through a RS-232 buss connector to a detector controller and then on to a computer for data storage and analysis. Modern detectors offer full programmability in two dimensions, low noise, high quantum efficiency, high dynamic range, and reasonable readout speeds. Further, the configuration of the detectors may be changed by software, an important requirement for a multichannel spectrograph. This is particularly the case for CID detectors where individual pixels are addressable.

The high spatial resolution imaging spectrograph in accordance with the present invention requires no power input, has no moving parts, and is completely passive with no operating controls or adjustments. The various components can be assembled in an instrument enclosure having a footprint of 1.1 ft$^2$ and a volume of less than 0.7 ft$^3$. Total weight for the system is approximately 10 pounds. In applications calling for additional channels of spatial resolution, the instrument as disclosed and illustrated in FIG. 3 is linearly scalable upward or downward to the desired size.

In use, then, a high spatial resolution imaging spectrograph in accordance with the present invention is selected compatible with the spatial resolution requirements of the application. Light from the object(s) to be analyzed is brought to the instrument by means of an optical fiber ribbon, which is placed at the focus of the collimating mirror 10. Light from individual fibers passes through the elongated slit 16 in the grating 14 and falls onto the collimating mirror 10, which reflects the light in parallel beams onto the grating 14. Light diffracted by the grating is collected by the focusing mirror 12, which focuses the light as close as possible to the incoming light from the object and onto the turning mirror 20. Light then travels into the camera mirror 22, which then focuses the image in the plane of a detector 24.

In this design, the angle between incoming and outgoing rays onto the collimating mirror 10 and the focusing mirror 12 is limited by the size of the turning mirror 20 in turn, the size of the turning mirror is defined by the spectral resolution required. The smaller the transverse dimension of the turning mirror, the smaller the number of independent channels of spectral information available and also the smaller the astigmatism introduced by spherical mirrors working slightly off axis, and, hence, the higher the spatial resolution of the instrument.

Figure 4:
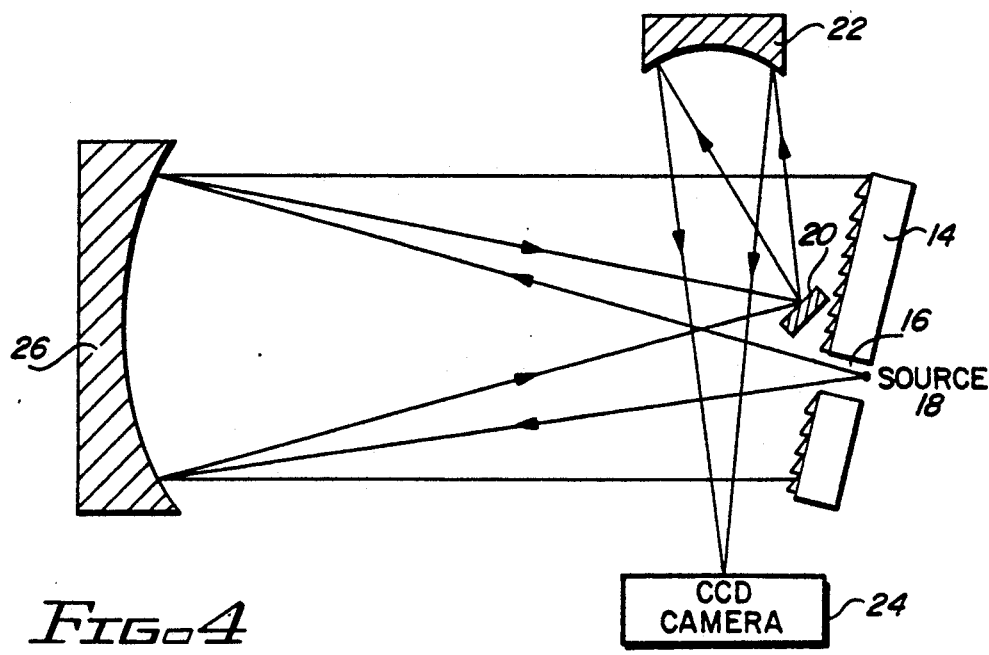
FIG. 4 is an optical ray path view along the cross-track axis of an alternative preferred embodiment of a high spatial resolution imaging spectrograph according to the present invention.

Referring now to FIG. 4, in another preferred embodiment of the invention, a high spatial resolution imaging spectrograph may be designed with a combination mirror 26, which serves both as a collimating mirror and a focusing mirror. This mirror, and the other components of the instrument, are the same as discussed above in connection with FIG. 3, although in this embodiment the grating works very close to the Littrow configuration. As discussed earlier, a high spatial resolution imaging spectrograph is limited in spectral resolution, or throughput, and this design optimizes throughput. As a result, the instrument can perform adequately with the use of a low dispersion plane diffraction grating, such as a 50 g/mm grating. Using such a low dispersion grating, the successive orders of the grating will be close to normal, allowing the functions performed by the collimating and focusing mirrors to be combined in a combination mirror 26. The use of a combination mirror allows the grating 14 to be positioned almost perpendicular to the optical axis of the instrument, a favorable configuration to introduce light through the grating. The ray path for a combination mirror system is illustrated in FIG. 4. A combination mirror design for a high spatial resolution imaging spectrograph is especially appropriate for applications where the need for spectral resolution is low.

Figure 5:
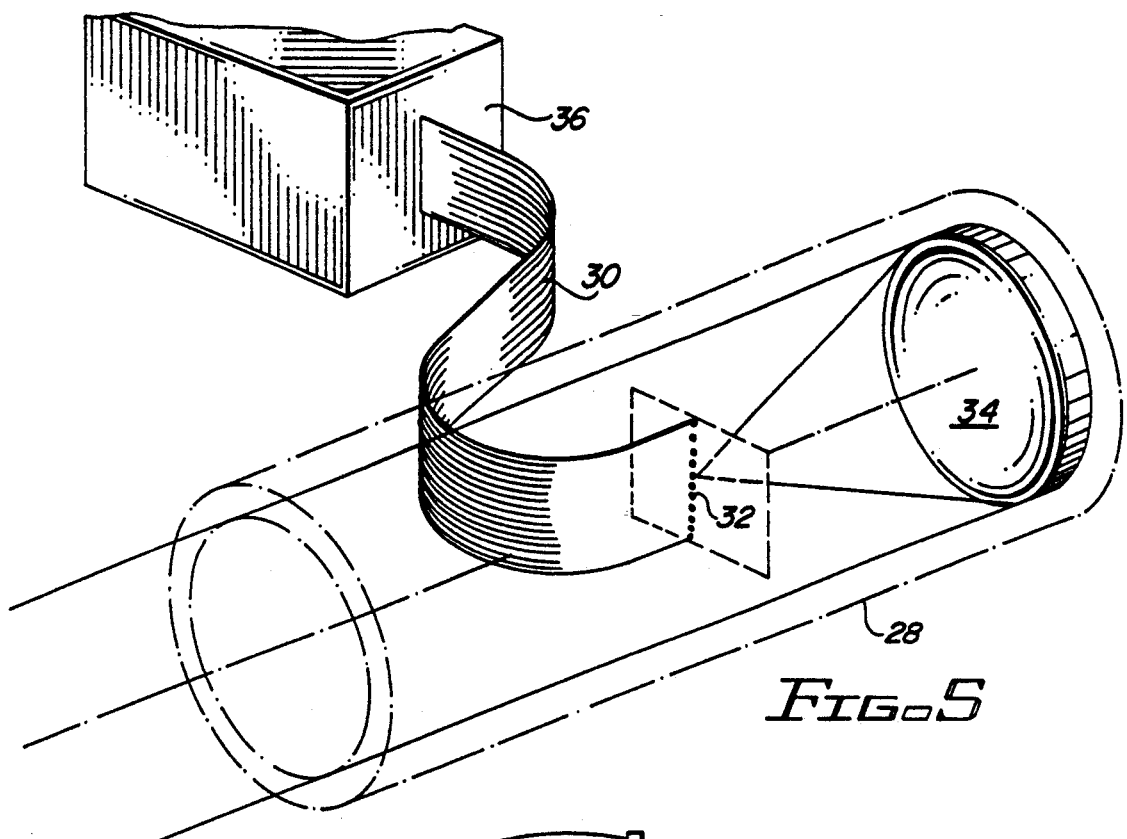
FIG. 5 is a pictorial representation of a significant commercial application of the high spatial resolution spectrograph in accordance with the present invention, showing an earth science remote imaging system comprising a high spatial resolution imaging spectrograph and a telescope connected to the spectrograph by means of an optical fiber ribbon.

Referring now to FIG. 5, a significant commercial application of the high spatial resolution spectrograph in accordance with the present invention is illustrated, showing an earth science remote imaging system. A reflecting telescope 28 of a conventional design is shown, with an optical fiber ribbon 30 mounted vertically at the primary focus 32 of an 8 inch primary mirror 34. The optical fiber ribbon 30 consists, for example, of 400 50 micron diameter optical fibers affixed together to form a vertical ribbon which is routed into the high spatial imaging spectrograph enclosure 36 and placed at the focus of the collimating mirror. The use of an optical fiber ribbon allows for the mechanical decoupling of the two instruments, affording flexibility in the design and use of the system.

The compact size and light weight of the earth science remote imaging system allows for its use in satellites or aircraft for terrestrial and oceanographic remote sensing research. Further, the use of a flexible optical fiber ribbon between the spectrograph and the telescope provides a soft link between the instruments, which facilitates their placement in the narrow confines of an aircraft or a satellite.

In use, then, an airborne or spaceborne system images an elongated area of the ground or sea along the vertical direction of the instrument in order to achieve high definition analysis of features on the surface. Spectral data are then collected for each independent spatial channel in a time short enough to use the natural translation of the carrier in the direction perpendicular to the area as a scanning device.

Figure 6:
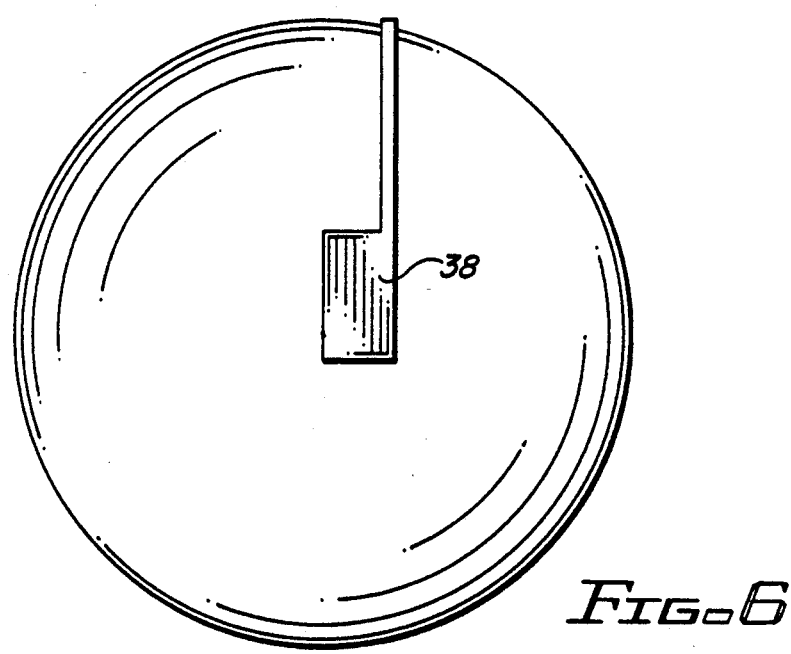
FIG. 6 is an elevational view of a collimating mirror showing the placement of an optical mask in front of the mirror.
Figure 7:
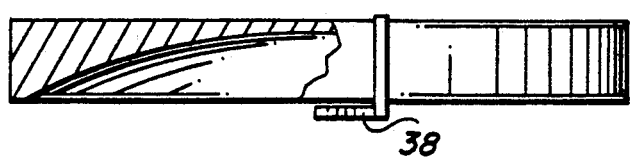
FIG. 7 is a cut-away sectional view of the mirror of FIG. 6 further showing the placement of a mask in front of the mirror.

Referring finally to FIGS. 6 and 7, a means to prevent stray light within a high spatial resolution imaging spectrograph is disclosed. An optical mask 38 is shown positioned in front of a collimating mirror 10 or a combination mirror 26, in the general shape of the turning mirror 20. The mask is carefully positioned in front of the mirror so as to suppress light which would fall on the turning mirror in the first pass of light from the collimating mirror, or combination mirror, to the grating. The mask is coated with a non-reflective coating to reduce light falling onto the turning mirror. Instead of a add-on mask as illustrated, the same effect can be achieved by coating an area of the collimating mirror or combination mirror with a non-reflective coating or etching the surface of the mirror.

While the invention has been described in connection with what is presently considered to be the most practical and preferred embodiments, the invention is not be to be limited to the disclosed embodiments, but on the contrary is intended to cover various modifications and equivalent arrangements included within the spirit and scope of the appended claims.

What is claimed is:

1. A spectrograph comprising:

a first spherical mirror;
a second spherical mirror;
an optical grating with an opening therein positioned to receive and direct radiation from said first spherical mirror to said second spherical mirror;
a turning mirror positioned adjacent said opening and at the focus of the said second spherical mirror to receive radiation from the said second spherical mirror;
a third spherical mirror to receive radiation from said turning mirror; and
light detection means;
whereby incoming radiation from an object positioned at the focus of said first spherical mirror passes through said opening to illuminate said first spherical mirror, which reflects the said radiation onto the said optical grating, which diffracts the said radiation onto the said second spherical mirror, which focuses the said radiation onto the said turning mirror, which reflects the said radiation onto the said third spherical mirror, which focuses the said radiation to form a spectral image on said light detection means.

2. A spectrograph as in claim 1, wherein said opening in said grating is an elongated slot positioned approximately in the center of the grating.

3. A spectrograph as in claim 2, wherein said grating is plane diffraction grating.

4. A spectrograph as in claim 1, wherein said turning mirror is a plane mirror positioned adjacent to said incoming radiation.

5. A spectrograph as in claim 1, wherein said light detection means consists of a CCD 2-D detector.

6. A spectrograph as in claim 1, wherein said light detection means consists of a CID 2-D detector.

7. A spectrograph as in claim 1, wherein said incoming radiation is remotely gathered and positioned at said focus of said combination mirror by means of an optical fiber.

8. A spectrograph as in claim 1, wherein said incoming radiation consists of multiple channels of vertically displayed radiation and forms spatially separate, vertically displayed spectral images on the light detection means.

9. A spectrograph as in claim 8, wherein said multiple channels of incoming radiation are positioned at said focus of combination mirror by means of an optical fiber ribbon.

10. A spectrograph as in claim 1, further comprising an optical mask positioned to suppress radiation falling on the turning mirror in the first pass of light from the first spherical mirror to the grating.

11. A spectrograph comprising:
a combination mirror;
an optical grating with an opening therein positioned to receive radiation from and direct radiation to said combination mirror;
a turning mirror positioned adjacent said opening and at an off-axis focus of said combination mirror to receive radiation from the said combination mirror;
a camera mirror to receive radiation from said turning mirror; and
light detection means;
whereby incoming radiation from an object positioned at the focus of said combination mirror passes through said opening to illuminate said combination mirror, which reflects the said radiation onto the said optical grating, which diffract the said radiation onto the said combination mirror, which focuses the said radiation onto the said turning mirror, which reflects the said radiation onto the said camera mirror, which focuses the said radiation to form a spectral image on said light detection means.

12. A spectrograph as in claim 11, wherein said opening in said grating is an elongated slot positioned approximately in the center of the grating.

13. A spectrograph as in claim 12, wherein said grating is plane diffraction grating.

14. A spectrograph as in claim 11, wherein said turning mirror is a plane mirror positioned adjacent to said incoming radiation.

15. A spectrograph as in claim 11, wherein said light detection means consists of a CCD 2-D detector.

16. A spectrograph as in claim 11, wherein said light detection means consists of a CID 2-D detector.

17. A spectrograph as in claim 11, wherein said incoming radiation is remotely gathered and positioned at said focus of said combination mirror by means of an optical fiber.

18. A spectrograph as in claim 11, wherein said incoming radiation consists of multiple channels of vertically displayed radiation and forms spatially separate, vertically displayed spectral images on the light detection means.

19. A spectrograph as in claim 18, wherein said multiple channels of incoming radiation are positioned at said focus of said combination mirror by means of an optical fiber ribbon.

20. A spectrograph as in claim 11, further comprising an optical mask positioned to suppress radiation falling on the turning mirror in the first pass of light from the combination mirror to the grating.

* * * * *